United States Patent
Stallings et al.

(10) Patent No.: US 10,230,917 B2
(45) Date of Patent: Mar. 12, 2019

(54) PROGRAM GUIDE GRAPHICAL USER INTERFACE SYSTEMS AND METHODS

(75) Inventors: Heath Stallings, Grapevine, TX (US); Brian Roberts, Frisco, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2115 days.

(21) Appl. No.: 11/500,208

(22) Filed: Aug. 7, 2006

(65) Prior Publication Data

US 2008/0046932 A1 Feb. 21, 2008

(51) Int. Cl.
*H04N 21/84* (2011.01)
*H04N 5/445* (2011.01)
*H04N 21/431* (2011.01)
*H04N 21/482* (2011.01)

(52) U.S. Cl.
CPC ..... *H04N 5/44543* (2013.01); *H04N 21/4314* (2013.01); *H04N 21/4316* (2013.01); *H04N 21/4821* (2013.01); *H04N 21/84* (2013.01)

(58) Field of Classification Search
CPC ........... H04N 5/44543; H04N 21/4314; H04N 21/4316; H04N 21/84
USPC ........................................ 725/39, 32, 40–42
See application file for complete search history.

(56) References Cited

U.S. PATENT DOCUMENTS

| | | | |
|---|---|---|---|
| 6,177,931 B1 * | 1/2001 | Alexander et al. | 725/52 |
| 6,577,350 B1 | 6/2003 | Proehl et al. | |
| 6,763,522 B1 * | 7/2004 | Kondo et al. | 725/39 |
| 6,857,128 B1 * | 2/2005 | Borden et al. | 725/39 |
| 2003/0126605 A1 * | 7/2003 | Betz et al. | 725/39 |
| 2004/0168188 A1 * | 8/2004 | Bennington et al. | 725/41 |
| 2005/0235321 A1 * | 10/2005 | Ahmad-Taylor | 725/56 |
| 2005/0251825 A1 * | 11/2005 | Fukuda et al. | 725/44 |
| 2006/0020971 A1 * | 1/2006 | Poslinski | 725/44 |
| 2007/0300256 A1 * | 12/2007 | Coomer et al. | 725/44 |
| 2008/0320523 A1 * | 12/2008 | Morris et al. | 725/47 |

* cited by examiner

*Primary Examiner* — Kunal Langhnoja

(57) ABSTRACT

In one of many possible embodiments, a system includes a media content processing subsystem configured to display a scrollable program guide graphical user interface. The graphical user interface is configured to show a multiplicity of blocks of information corresponding to a multiplicity of content carriers. The processing subsystem is further configured to display a magnified area within the program guide graphical user interface. When a block corresponding to a particular content carrier within the multiplicity of content carriers is entered into the magnified area, the processing subsystem is configured to display enhanced information corresponding to one or more media content instances transmitted via the particular content carrier.

1 Claim, 13 Drawing Sheets

PROGRAM GUIDE GRAPHICAL USER INTERFACE SYSTEMS AND METHODS

BACKGROUND INFORMATION

The advent of computers, interactive electronic communication, the Internet, and other advances in the digital realm of consumer electronics have resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is typically connected to a cable or satellite, or generally, a subscriber television system, and includes hardware and software necessary to provide enhanced options for a subscriber television system at a subscriber location. Conventional STBs include a processor, communication components, and memory and are connected to a television or other display device, such as a personal computer. While many STBs are stand-alone devices that are externally connected to a television, an STB and/or its functionality may be integrated into a television or personal computer, a mobile device such as a mobile phone or a personal digital assistant ("PDA"), or even into an audio device such as a programmable radio, as is known.

An STB is usually configured to provide users with a large number and variety of media content choices. For example, a user may choose to view a variety of broadcast television programs, pay-per-view services, video-on-demand programming, Internet services, and audio programming via an STB.

However, the large number of media content choices often makes it difficult for an STB user to find and select a desired media content instance for viewing. On-screen program guides have alleviated this confusion to some degree. However, the use of an on-screen program guide is cumbersome in many instances and often results in missed viewing opportunities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Exemplary systems and methods for displaying enhanced information corresponding to one or more media content instances within a program guide graphical user interface ("GUI") are described herein. As used herein, the term "media content instance" will be used to refer generally to any television program, on demand program, pay-per-view program, broadcast media program, IPTV, commercial, advertisement, video, movie, song, image, photograph, sound, or any segment of these or other forms of media content that may be experienced or viewed by a user.

The exemplary systems and methods described herein generally enable a user to conveniently view or otherwise experience enhanced information corresponding to one or more media content instances within a program guide GUI. The enhanced information may include, but is not limited to, a title, a subtitle, a program summary, an advertisement, a hyperlink, an image or photograph, a logo, an icon, a current time, a progress bar, a video feed, a picture-in-picture video feed, and/or any other type of content related information.

In certain embodiments, a media content processing subsystem, such as a set-top box ("STB"), is configured to display a magnified area within a scrollable program guide GUI. The magnified area may be stationary and vertically centered within the program guide GUI, for example. When a program guide block corresponding to a particular content carrier (e.g., channel) is entered into the magnified area, enhanced information corresponding to one or more media content instances transmitted via the content carrier is displayed within the magnified area.

The systems and methods described herein may be used to provide media content consumers with additional content that may not be accessible via traditional program guide GUIs. For example, the systems and methods described herein may facilitate more effective advertising and content promotion. Users also benefit from the systems and methods described herein by being able to easily access enhanced information that is related to a particular media content instance.

Components and functions of exemplary embodiments of program guide GUI systems and methods will now be described in more detail.

II. Exemplary System View

Figure 1:
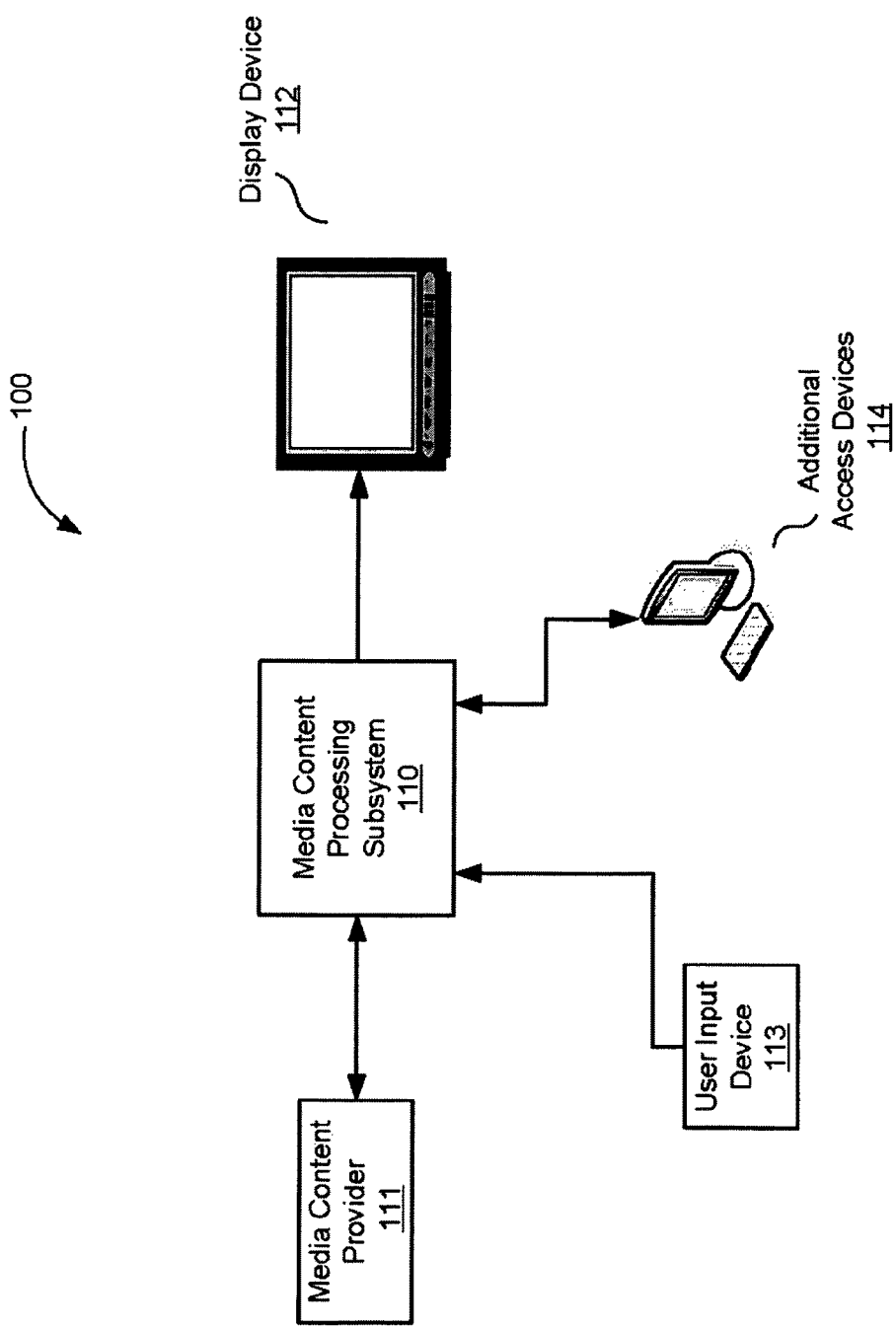
FIG. 1 illustrates an example of a media content access system, according to an embodiment.

FIG. 1 illustrates an example of a media content access system 100, according to one exemplary embodiment.

Media content access system 100 may take many different forms and include multiple and/or alternate components and facilities.

As shown in FIG. 1, a media content processing subsystem 110 is configured to communicate with and receive a signal or data stream (e.g., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 may use any suitable technology or technologies to receive the media content instance from the media content provider 111, including using a tuner to receive the media content instance, as described below. The media content processing subsystem 110 may be configured to process the media content stream provided by the media content provider 111, including causing the media content instance, or one or more components (e.g., video and/or audio components) of the media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display device 112 (e.g., a television, computer monitor, etc.) so that the display device 112 may present (e.g., display) the media content instance for experiencing by the user.

As shown in FIG. 1, and as will be described in more detail below, the media content processing subsystem 110 may be controlled by a user input device 113 (e.g., a remote control device) and/or a number of additional access devices 114 (e.g., a personal computer, wireless device, mobile phone, etc.).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to audio-visual content (e.g., broadcast television programs, pay-per-view services, Internet Protocol Television ("IPTV"), Digital Video Disc ("DVD") related content, or video-on-demand programming), pre-recorded media content, data communication services such as Internet services, images, and audio programming.

Figure 2:
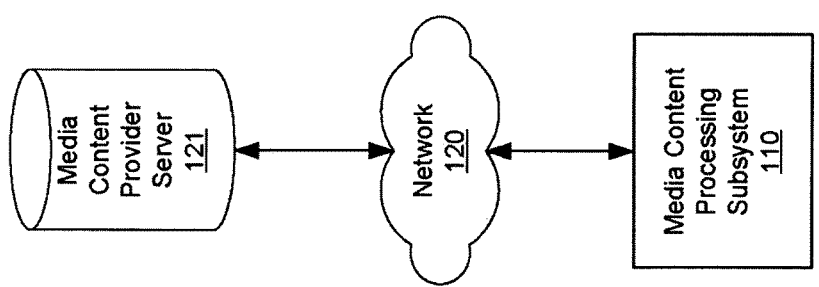
FIG. 2 is an illustration of an exemplary media content provider network, according to an embodiment.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 may be connected directly to the media content provider server 121.

B. Display Device

As mentioned, the processing subsystem 110 may be coupled to a display device 112 configured to present media content to a user. For example, the display device 112 may display or play the media content. The display device 112 may include, but is not limited to, a television, computer monitor, mobile phone, handheld device, or any other device configured to present media content to a user.

C. Media Content Processing Subsystem

Figure 3:
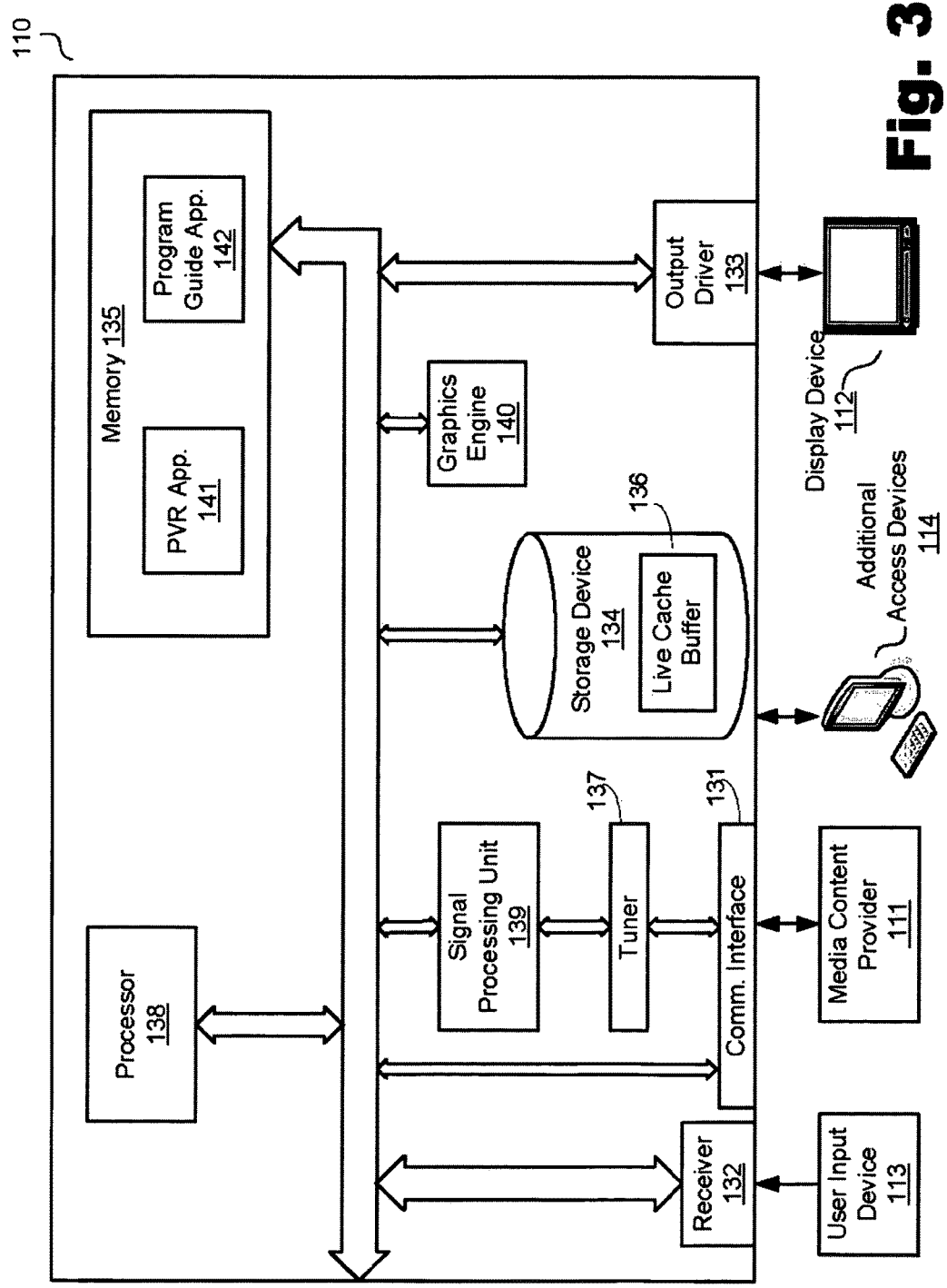
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible receivers that receive and process digital and/or analog media content. Hence, an exemplary processing subsystem 110 may include, but is not limited to, a set-top box ("STB"), home communication terminal ("HCT"), digital home communication terminal ("DHCT"), stand-alone personal video recorder ("PVR"), DVD player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive media content in any format from the media content provider 111 or from any other suitable media content source. The communication interface 131 may include any device, logic, and/or other technologies suitable for receiving signals and/or data representative of media content. In certain embodiments, the communication interface 131 may include a single port configured to receive media content from the media content provider 111 and/or from any other source (e.g., from another processing subsystem, another server, etc.) For example, the communication interface 131 may include or be connected to a broadband connection, which can enable the processing subsystem 110 to receive media content on a single port from multiple sources. In other embodiments, multiple ports may be used. The communication interface 131 may be configured to interface with any suitable communication media, protocols, and formats, including any of those mentioned above.

The processing subsystem 110 may also include a receiver 132 configured to receive input commands from a user input device 113. The user input device 113 may include, for example, a remote control, keyboard, or any other suitable input device and may be configured to communicate with the receiver 132 via a wireless link, electrical connection, or any other suitable communication link.

Figure 4:
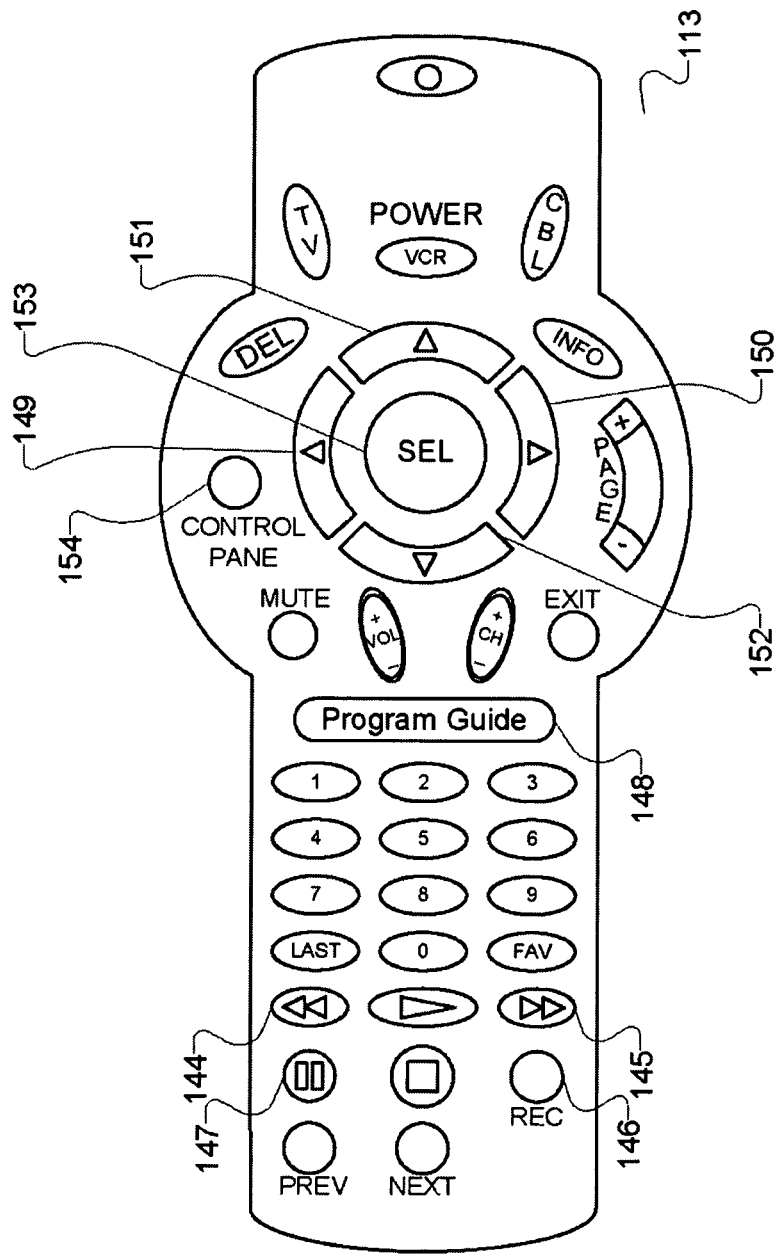
FIG. 4 illustrates an exemplary remote control user input device, according to an embodiment.

An exemplary remote control user input device 113 is illustrated in FIG. 4. In some examples, the input device 113 may be configured to enable a user to control viewing options of the media content. For example, rewind 144 and fast-forward buttons 145 enable a user to access different scenes or frames within media content stored in a live cache buffer 136. A record button 146 may also be included which enables the user to designate as permanently recorded any media content instance buffered in the live cache buffer 136. A pause button 147 may enable the user to pause a media content instance. A program guide button 148, as will be described in more detail below, may be configured to evoke the display of a program guide on the display device 112. A left button 149, right button 150, up button 151, down button 152, and select button 153 may be included and configured to enable the user to evoke and/or navigate through various views and graphical user interfaces displayed by the display device 112.

It will be recognized that the input device 113 shown in FIG. 4 is merely illustrative of the many different types of user input devices that may be used in connection with the present systems and methods.

Returning to FIG. 3, a number of additional access devices 114 may also be configured to communicate with the processing subsystem 110. These access devices 114 may include, but are not limited to, personal computers and mobile devices (e.g., laptops, PDAs, cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory (RAM), dynamic RAM (DRAM), or a combination thereof. In some examples, as will be described in more detail below, various applications (e.g., a program guide application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. In some examples, media content data may be temporarily stored in the live cache buffer 136 to facilitate viewing of the media content in one or more trick play modes.

3. Tuner

Tuner 137 is configured to tune to a particular television channel, stream, address, frequency or other carrier (i.e., content carrier) in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether the media content is to be deleted. As used herein, the term "permanent recording" will be understood to mean media content that is stored for an extended period of time as decided by the user.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

In some examples, if the incoming media content is in the form of IP data packets (e.g., in IPTV configurations), the media content may be processed directly by the processor 138 and/or any other processor configured to process IP data packets.

The processing subsystem 110 may also include a graphics engine 140 configured to generate graphics that are to be displayed by the display device 112. The graphics may include graphical user interfaces such as, but not limited to, one or more program guides, progress bars, and other graphics.

5. Application Clients

Returning to FIG. 3, one or more applications 141-142 residing within the processing subsystem 110 may be executed upon initiation by a user of the processing subsystem 110. The applications 141-142, or application clients, may reside in memory 135 or in any other area of the processing subsystem 110 and be executed by the processor 138. The applications 141-142 shown in FIG. 3 are merely illustrative of the many different applications that may reside within the processing subsystem 110.

As shown in FIG. 3, one of the applications may include a personal video recording (PVR) application 141. A PVR application is also referred to as a digital video recording (DVR) application. As used herein and in the appended claims, unless otherwise specifically denoted, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 141 may also provide for media content recording functionality by enabling the temporary and/or permanent recording of media content to the storage device 134.

In some examples, the PVR application 141 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 141 is integrated into the processing subsystem 110 for illustrative purposes only.

The processing subsystem 110 may additionally or alternatively include a program guide application 142 configured to generate a program guide that is displayed on the display device 112. An exemplary program guide, as will be described in more detail below, includes a GUI that performs various functions including allowing a user to select and/or view information and options associated with various media content instances.

Figure 5:
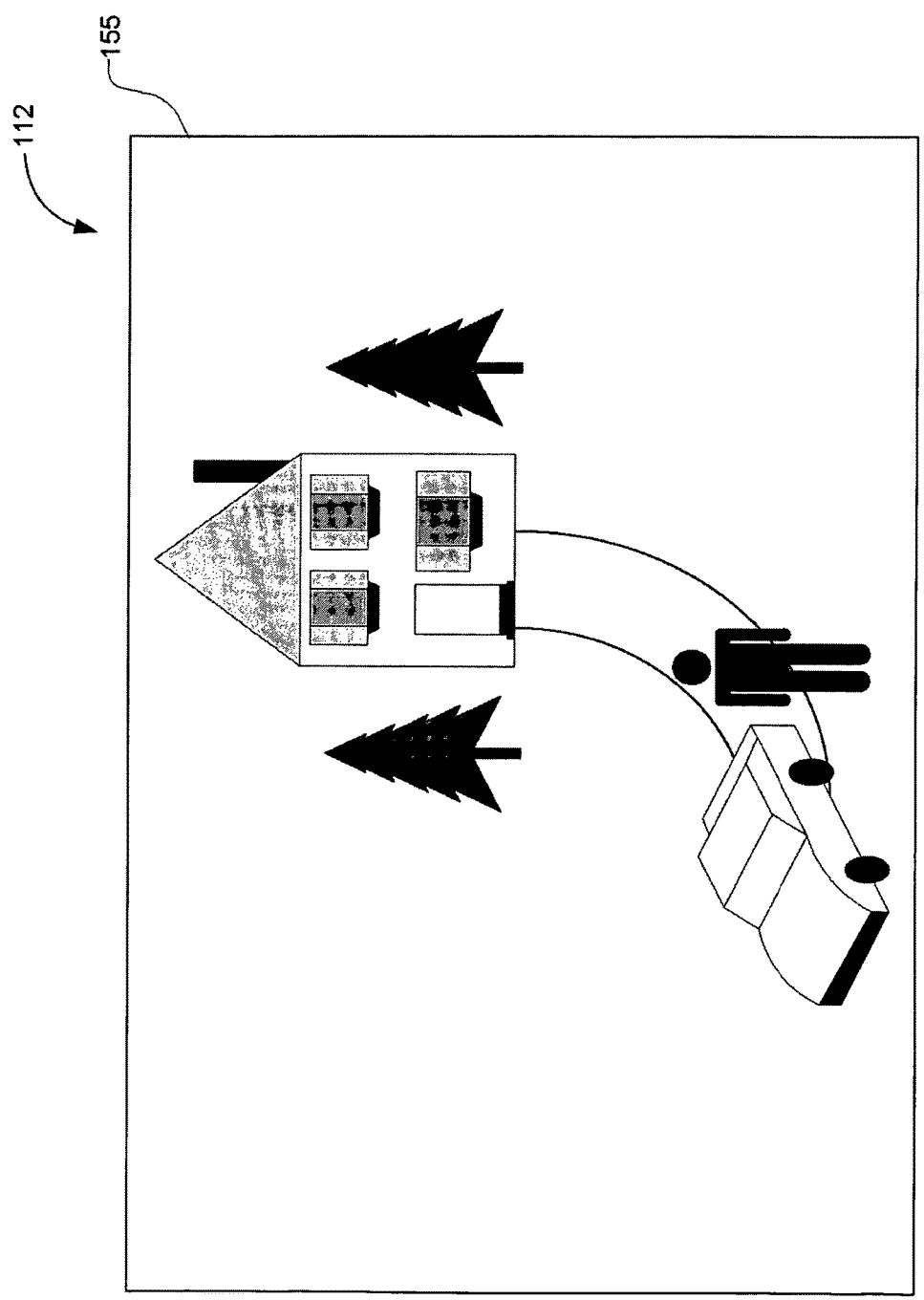
FIG. 5 illustrates a viewing screen of an exemplary display device with a particular scene or frame of media content displayed thereon, according to an embodiment.

To facilitate an understanding of the program guide application 142, FIGS. 5-12 illustrate various embodiments of views caused to be displayed on the display device 112 by the processing subsystem 110. An exemplary media content scene is shown in FIG. 5. FIG. 5 illustrates a viewing area or screen 155 of an exemplary display device 112 with a particular scene or frame of a media content instance displayed thereon. In some examples, the user may be interested in viewing a program guide GUI in order to access a different media content instance and/or view information related to one or more media content instances.

Figure 6:
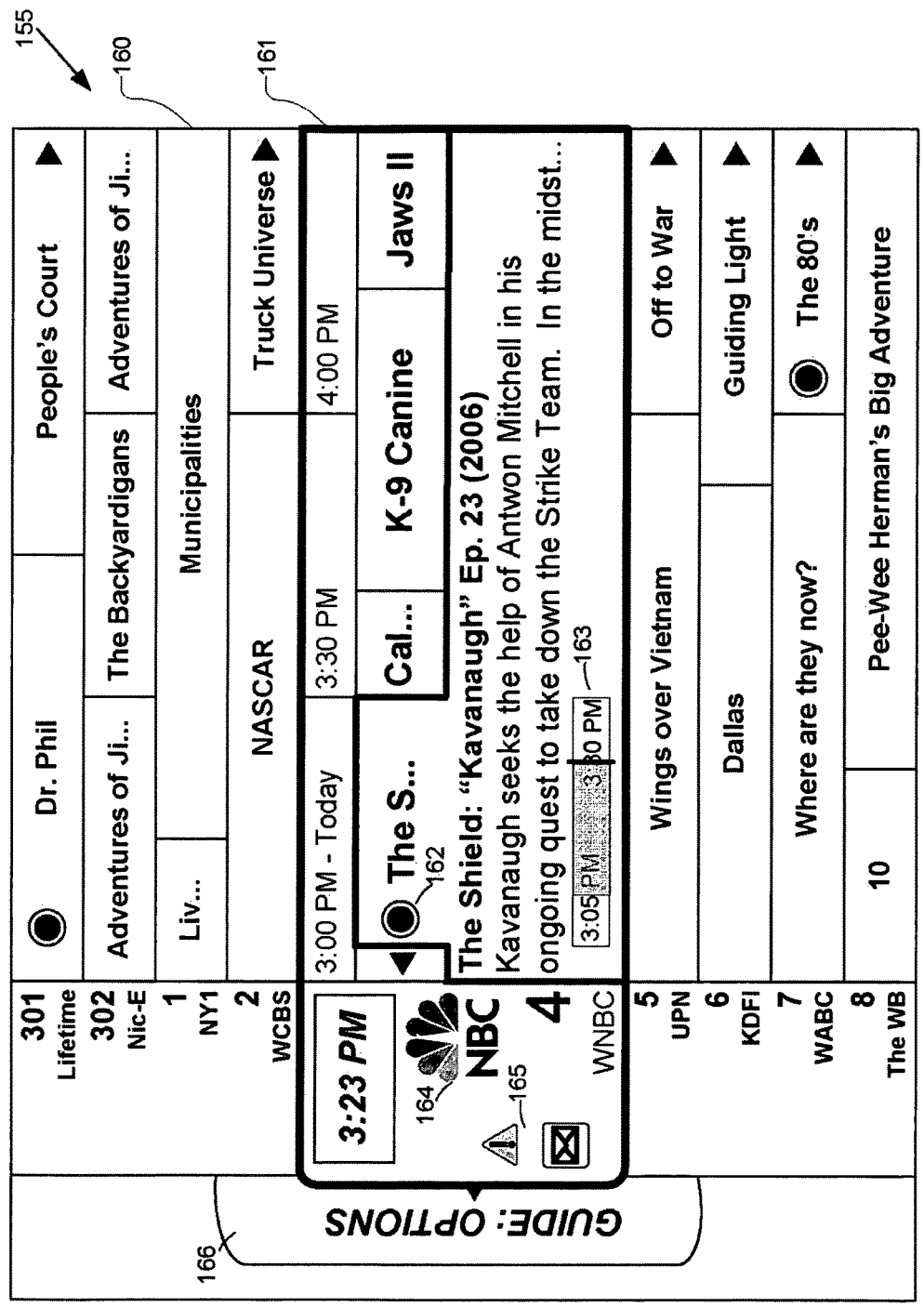
FIG. 6 illustrates an exemplary full screen program guide graphical user interface, according to an embodiment.

FIG. 6 illustrates an exemplary program guide GUI 160 (or simply program guide 160) that may be displayed by the display device 112. The program guide 160 may be evoked using a number of different methods. For example, the user may press a dedicated button on a user input device (e.g., the program guide button 148 on the remote control user input device 113). Additionally or alternatively, the user may evoke the program guide 160 by pressing one of the arrow keys 149-152.

The program guide 160 of FIG. 6 occupies the entire viewing screen 155 of the display device 112. However, as will be described in more detail below, the program guide 160 may alternatively occupy only a portion of the viewing screen 155.

As shown in FIG. 6, the program guide 160 may be displayed in a grid-like style with a number of blocks of information corresponding to a number of media content instances being broadcast, streamed, or otherwise transmitted during a specified period of time. For example, the program guide 160 of FIG. 6 shows the titles of the media content instances being broadcast on a number of different channels during a 1.5 hour time period between 3:00 PM and 4:30 PM. The size of the time period shown in the program guide 160 may vary as may serve a particular application and may be specified by the user. Moreover, it will be recognized that the term "channel" will be used herein to refer broadly to any analog, digital, or other type of channel and that in turn "channel" is an example of a content carrier as discussed above.

It will be assumed that the media content instances are broadcast in the examples given herein for illustrative purposes only. However, it will be recognized that the media content instances may additionally or alternatively be streamed or otherwise transmitted to the processing subsystem 110.

The program guide 160 of FIG. 6 shows the titles corresponding to media content instances being broadcast on nine channels for illustrative purposes only. It will be recognized that the number of channels for which information is displayed in the program guide 160 may vary as may serve a particular application. Moreover, the type of information displayed for each media content instance may vary as may serve a particular application.

In some examples, the user may use the left and right buttons 149 and 150 to scroll backwards and forwards in time to view information corresponding to media content instances broadcast at different times than those currently shown in the program guide 160 of FIG. 6. For example, with reference to the program guide 160 shown in FIG. 6, the user may scroll forward in time to view information corresponding to media content instances to be broadcast after 4:30 PM.

The user may also use the up and down buttons 151 and 152 to view information corresponding to channels not being currently displayed in the program guide 160. For example, with reference to the program guide 160 shown in FIG. 6, the user may scroll down one channel to view information corresponding to channel 302 through channel 10.

In some embodiments, the program guide 160 includes a magnified area 161 in which enhanced information corresponding to media content instances that are broadcast on a particular channel is displayed. For example, the magnified area 161 of FIG. 6 displays enhanced information corresponding to one or more media content instances that are broadcast on channel 4 (WNBC). As used herein, the term "enhanced information" refers to information that is in addition to the information displayed for channels not located within the magnified area 161. For example, the enhanced information may include, but is not limited to, a title, a subtitle, a program summary, an advertisement, a hyperlink, an image (e.g., a photograph, a logo, or an icon), a current time, a progress bar, a video feed, a picture-in-picture video feed, and/or any other type of information corresponding to one or more of the media content instances broadcast on the channel located within the magnified area 161.

The magnified area 161 may additionally or alternatively include a time scale. For example, as shown in FIG. 6, a time scale showing the times in half-hour increments from 3:00 PM through 4:30 PM is shown within the magnified area 161. The time scale labels change accordingly as the user scrolls backwards or forwards in time.

In some examples, as shown in FIG. 6, the row within the program guide 160 that corresponds to the magnified area 161 may be larger than the other rows within the program guide 160. Additionally or alternatively, the magnified area 161 may be distinguished from the other blocks of information within the program guide 160 by having a different color, border, font, and/or other attribute than the other blocks of information within the program guide 160.

As shown in FIG. 6, the magnified area 161 is substantially centered vertically within the program guide 160. However, it will be recognized that the magnified area 161 may be located anywhere within the program guide 160 as may serve a particular application.

As will be described in more detail below, the magnified area 161 is shown as remaining stationary, even when a user scrolls up or down through the available channels. Hence, when a user scrolls through the available channels, the row corresponding to the channel directly above or below the currently magnified channel moves into the magnified area 161 and enhanced information corresponding to the newly magnified channel is displayed therein. However, it will be recognized that the magnified area 161 may alternatively be configured to move as the user scrolls through the available channels.

By including the enhanced information corresponding to a selected channel within the magnified area 161, all of the enhanced information pertaining to a selected channel may be easily accessed or viewed by a user. Because the magnified area 161 is stationary, the user may focus his or her attention on only one portion of the viewing screen 155 and as he or she scrolls through the various channels in order to view desired information.

To illustrate various features of the magnified area 161, the particular magnified area 161 shown in FIG. 6 will now be described in more detail. It will be recognized that the magnified area 161 shown in FIG. 6 may include additional or alternative enhanced information as may serve a particular application.

As shown in FIG. 6, the row of the program guide 160 corresponding to channel 4 (WNBC) is currently within the magnified area 161. A media content instance entitled "The Shield: Kavanaugh" is currently selected, as indicated by the border that surrounds the program description thereof.

As can be seen in the exemplary magnified area 161, the selected media content instance started being broadcast at 3:05 PM and will stop being broadcast at 3:30 PM. In some examples, a user may cause the processing subsystem 110 to record the selected media content instance by pressing the record button 146 on the remote control input device 113. However, it will be recognized that any other method of evoking a recording function of the processing subsystem 110 may additionally or alternatively be used. In some examples, a recording icon 162 may be displayed within a block of the program guide 160 corresponding to a media content instance marked for recording.

Additionally or alternatively, a progress bar, e.g., progress bar 163, may be displayed within the magnified area 161 to graphically illustrate the amount of the selected media content instance that has been recorded by the processing subsystem 110. For example, as shown in FIG. 6, the progress bar 163 includes a shaded portion that indicates that the processing subsystem 110 has recorded a portion of "The Shield: Kavanaugh." It will be recognized that the progress bar 163 of FIG. 6 is illustrative of the many different types of progress bars that may be used to illustrate an amount of a selected media content instance that has been recorded.

One or more logos and/or icons may additionally or alternatively be displayed within the magnified area 161. For example, a trademarked logo of a particular channel, such as the NBC® logo 164, may be displayed within the magnified area 161. One or more icons, such as icons 165, may also be displayed within the magnified area 161. In some examples, a user may select one or more of the logos 164 or icons 165 in order to access additional information and/or options. For example, a user may select the NBC® logo 164 in order to access a webpage and/or other information corresponding to NBC® programming. The user may additionally or alternatively select one of the icons 165 to mark the selected media content instance, add the selected the media content instance to a favorites list, transmit a snippet or clip of the selected media content instance to another user, and/or record the selected media content instance.

In some examples, the user may select a program guide options link 166 to configure one or more options of the program guide 160. Exemplary options that may be configured by the user may include, but are not limited to, viewing options, time scale options, video feed options, color and formatting options, etc. For example, the user may select the options link 166 to filter the types of media content instances that are displayed within the program guide 160. For example, the user may select an option to display information for movies, high definition media content instances, favorites, kid's programming, etc.

Figure 7:
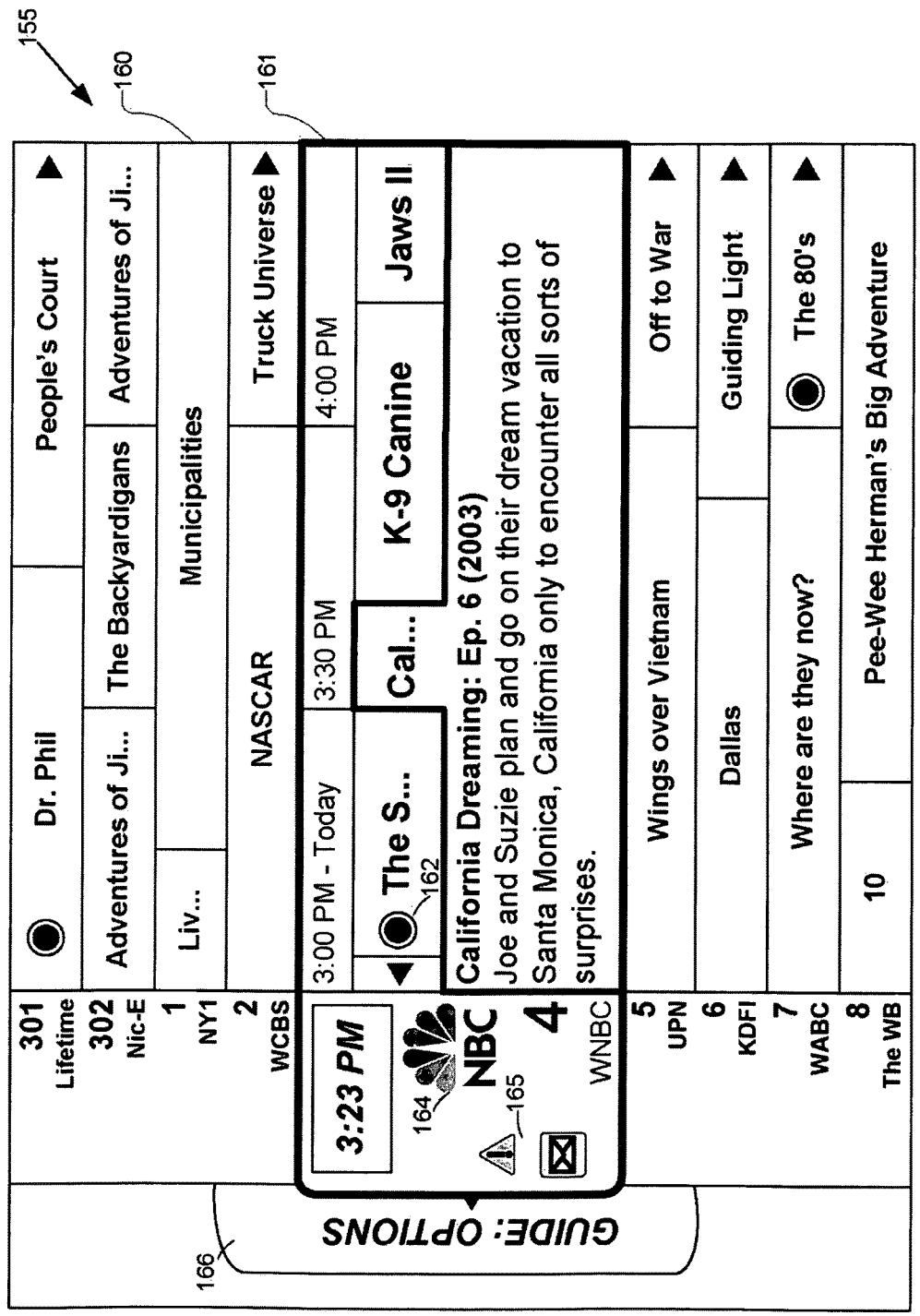
FIG. 7 illustrates an exemplary view of the program guide of FIG. 6, according to an embodiment.

As mentioned, the user may use the navigation buttons 149-152 to navigate through information corresponding to different media content instances. For example, FIG. 7 illustrates an exemplary view of the program guide 160 of FIG. 6 wherein the user has selected a media content instance entitled "California Dreaming" by pressing the right arrow button 150 once. As shown in FIG. 7, the program description has changed from that shown in FIG. 6 to include a description of the newly selected media content instance. It will be recognized that a user may access enhanced information corresponding to any media content instance having any length in time. Hence, the user may access enhanced information corresponding to the media content instance entitled "California Dreaming" even though the media content instance is only approximately ten minutes long.

Figure 8:
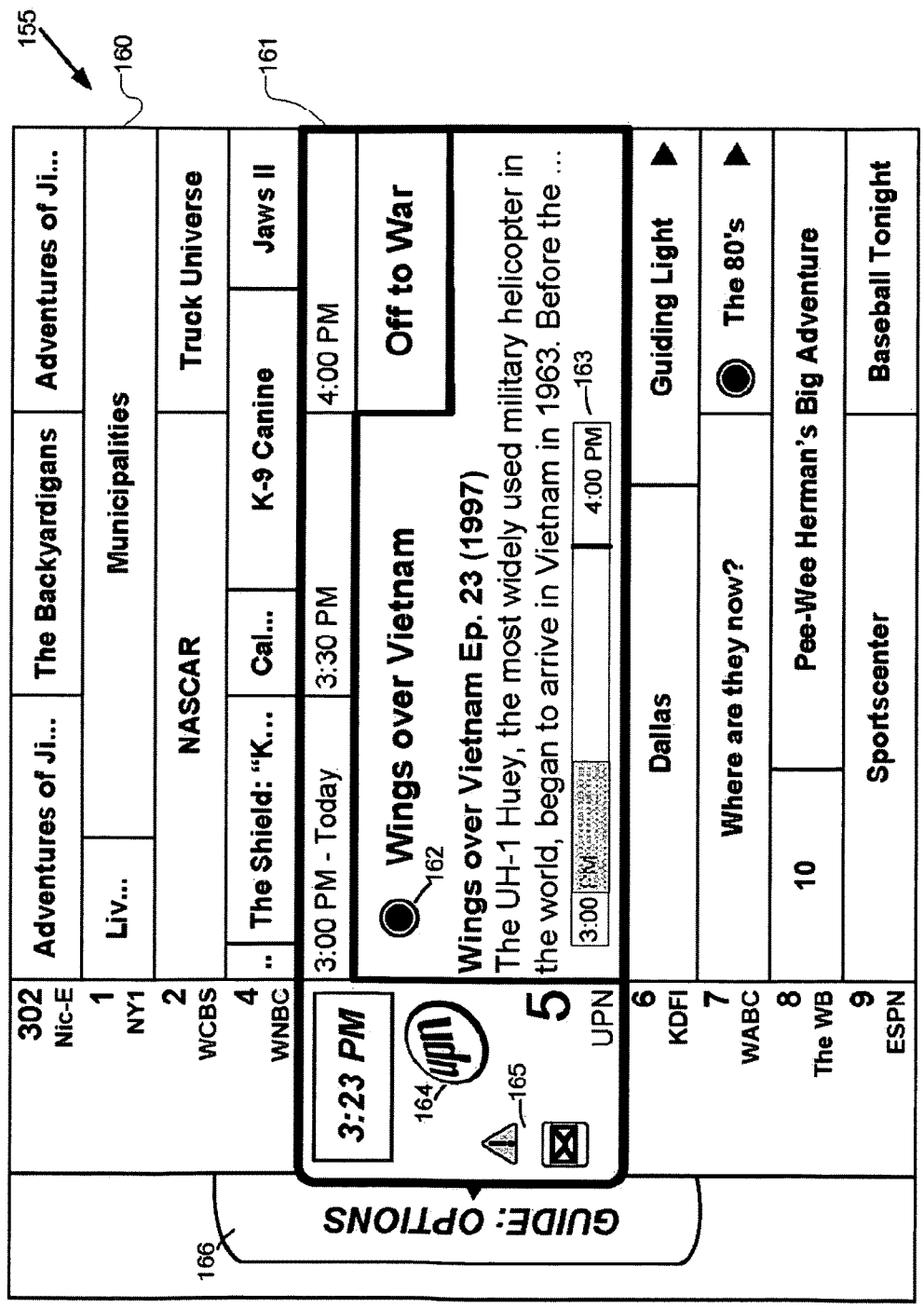
FIG. 8 illustrates another exemplary view of the program guide of FIG. 6, according to an embodiment.

FIG. 8 illustrates an exemplary view of the program guide 160 wherein the user has scrolled the program guide 160 up one row by pressing the up arrow button 151. In some alternative embodiments, the down arrow button 152 may be configured to scroll the program guide 160 up. As shown in FIG. 8, the magnified area 161 remains stationary in the middle of the screen 155 while the row corresponding to channel 5 (UPN) scrolls up and into the magnified area 161. In this manner, enhanced information corresponding to one or more media content instances broadcast on channel 5 (UPN) may be displayed within the magnified area 161. As shown in FIG. 8, one or more of the logos 164 and/or icons 165 may change accordingly.

Figure 9:
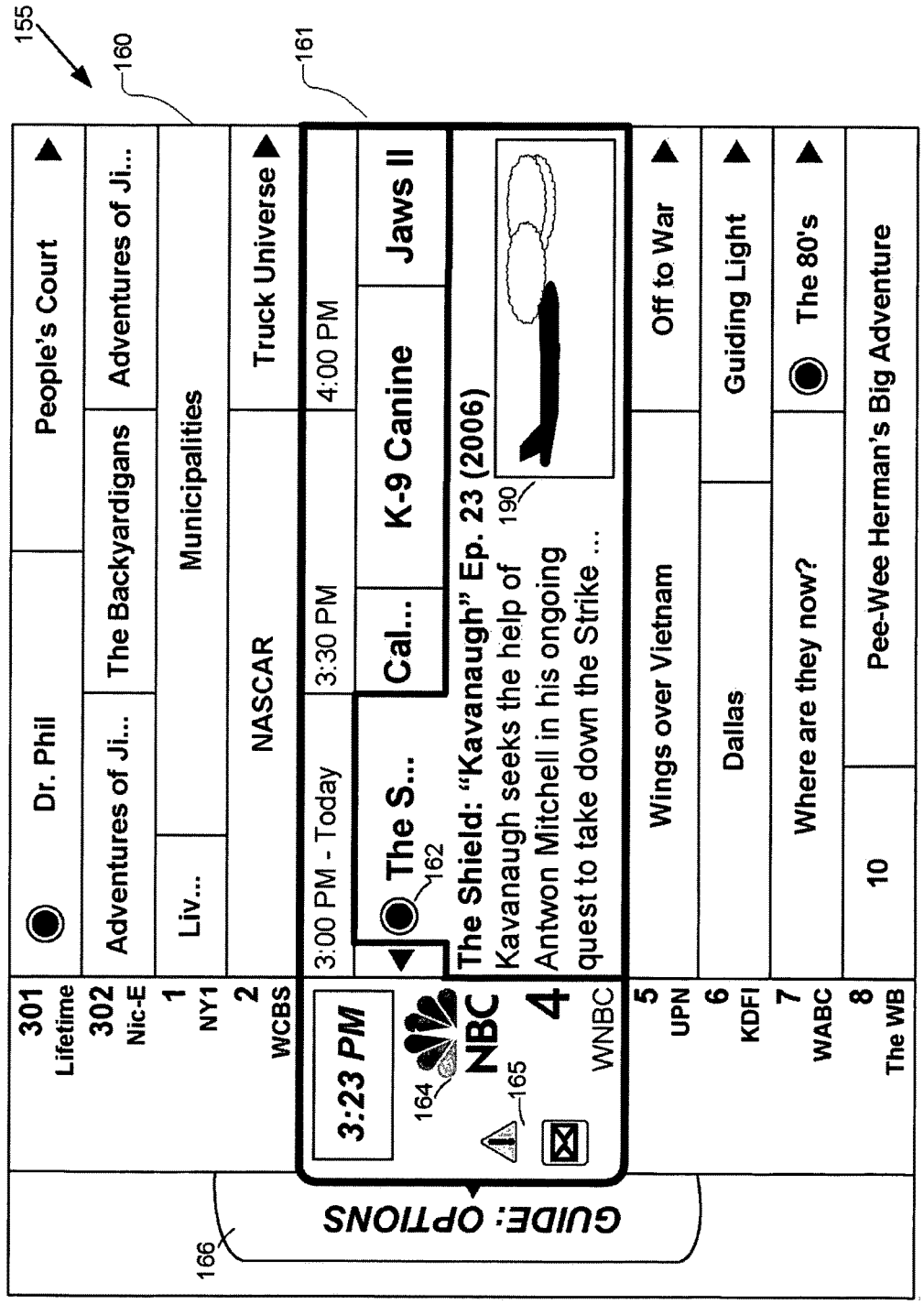
FIG. 9 illustrates an exemplary view of the program guide of FIG. 6 wherein a video feed of a media content instance is displayed within a magnified area, according to an embodiment.

In some embodiments, as shown in FIG. 9, a video feed of the media content instance that is currently being broadcast on the channel that is within the magnified area 161 may be displayed within the magnified area 161. For example, as shown in FIG. 9, a video feed 190 of the media content instance entitled "The Shield: Kavanaugh" may be displayed within the magnified area 161 while the user navigates within the program guide 160. In this manner, the user may access information within the program guide 160 while at the same time viewing a video feed 190 of the media content instance that is currently being broadcast on the channel within the magnified area 161. In some examples, the displayed media content instance 190 appears within the magnified area 161 after a predetermined time interval. However, it will be recognized that the particular display options associated with the video feed 190 may be specified by the user or by the media content provider. It will also be recognized that an audio feed and/or any other type of media content feed may additionally or alternatively be included within the magnified area 161.

In some examples, the user may enter a particular channel number using the buttons on the remote control input device 113 while the program guide 160 is displayed on the viewing screen 155. The content within the magnified area 161 may then change to display enhanced information corresponding to the newly entered channel. The remaining rows within the program guide 160 may also be updated to adjust to the newly selected channel.

Figure 10:
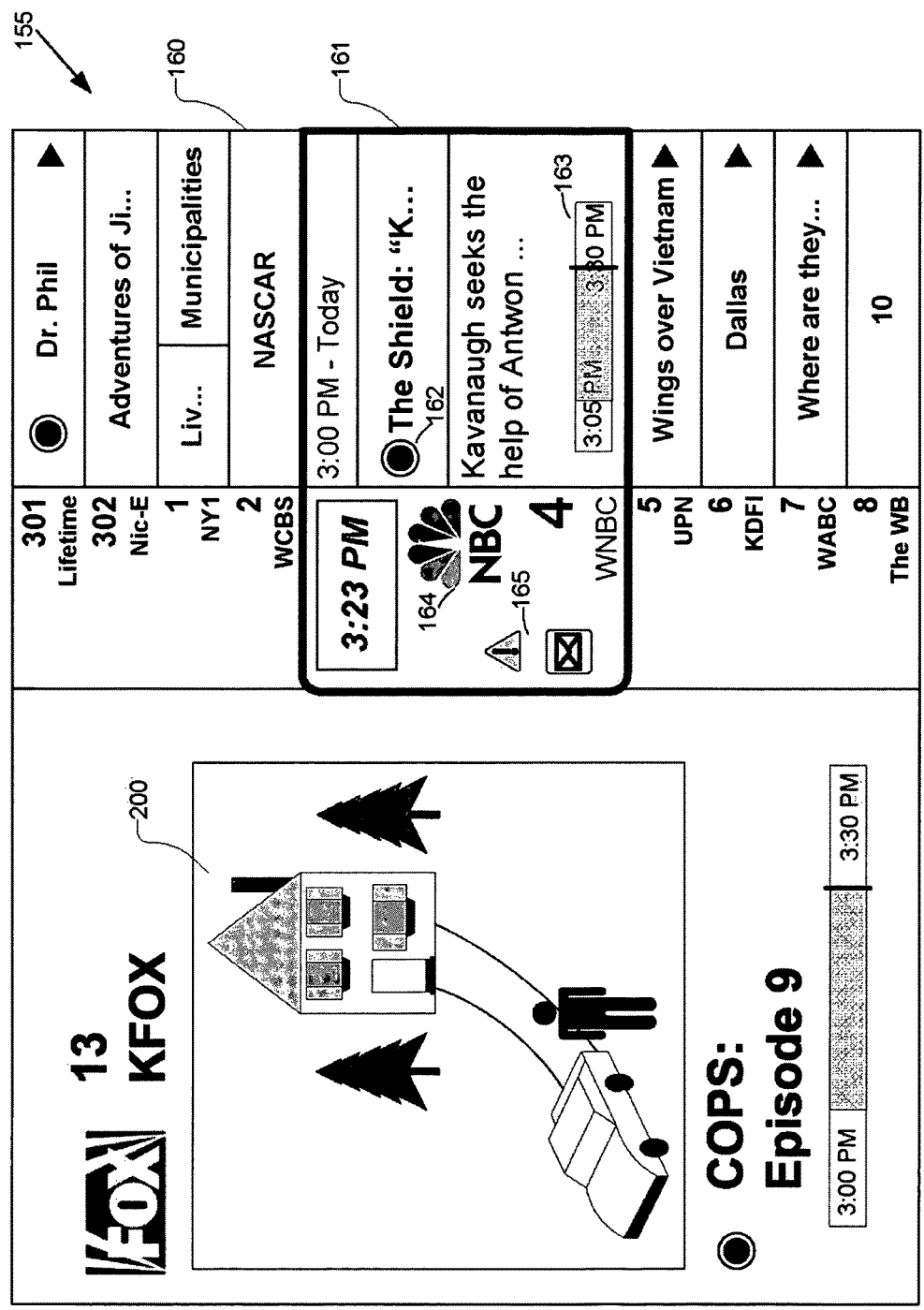
FIG. 10 illustrates an exemplary program guide configured to only partially occupy the viewing screen, according to an embodiment.

In some embodiments, the program guide 160 may only partially occupy the viewing screen 155. For example, FIG. 10 illustrates an exemplary program guide 160 configured to only partially occupy the viewing screen 155. As shown in FIG. 10, the program guide 160 may be configured to occupy a right-hand portion of the viewing screen 155 while an ongoing content feed 200 of a particular media content instance is being displayed in the left-hand portion of the viewing screen 155. The ongoing content feed 200 will be referred to herein as a primary feed for explanatory purposes. In this manner, a user may browse through the program guide 160 while at the same time viewing the primary feed 200. It will be recognized that the program guide 160 of FIG. 10 occupies the right-hand portion of the viewing screen for illustrative purposes only and that the program guide 160 may alternatively occupy any portion of the viewing screen 155 as may serve a particular application. It will also be recognized that the primary feed 200 may additionally or alternatively include an audio feed or any other type of media content instance feed.

As shown in FIG. 10, the magnified area 161 of the program guide 160 is substantially centered vertically within the viewing screen 155. However, it will be recognized that the magnified area 161 may be located anywhere within the program guide 160.

The time period shown in the program guide 160 of FIG. 10 is a half hour for illustrative purposes only. It will be recognized that the length of the time period may be specified by the user or by the media content provider as desired.

In some examples wherein the processing subsystem 110 is capable of processing and simultaneously displaying multiple content feeds on the viewing screen 155 (e.g., in a multi-tuner processing subsystem 110 and/or in a processing subsystem 110 configured to process IP video streams), one or more video feeds may be displayed within the program guide 160 at the same time that the primary media content instance 200 is being displayed. It will also be recognized that the one or more content feeds may additionally or alternatively include one or more video feeds, audio feeds and/or any other type of media content instance feed.

Figure 11:
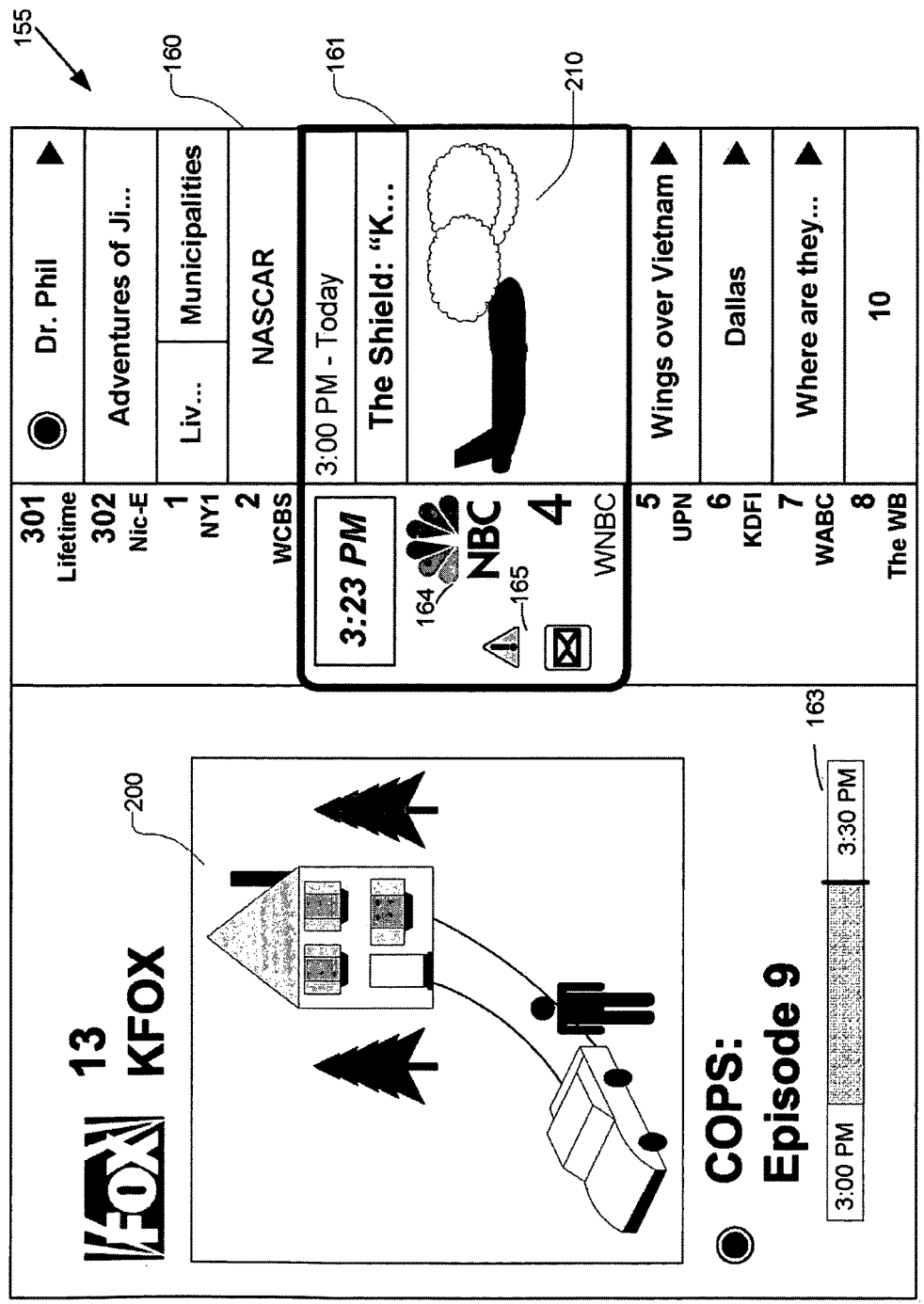
FIG. 11 illustrates an exemplary view of the program guide of FIG. 10, according to an embodiment.

For example, FIG. 11 illustrates an exemplary program guide 160 with a secondary content feed 210 being displayed within the magnified area 161 at the same time that the primary feed 200 is being displayed in the left-hand portion of the viewing screen 155. Both primary feed 200 and secondary content feed 210 include a video feed in the illustrated embodiment. In some embodiments, the content feed 210 displayed within the magnified area 161 corresponds to a media content instance being currently broadcast on the channel that is within the magnified area 161.

In some examples, the content feed 210 may be configured to appear within the magnified area 161 a pre-determined amount of time after a row within the program guide 160 enters the magnified area 161. The pre-determined amount of time may be specified by the user. For example, if a user causes a row corresponding to a particular channel to enter the magnified area 161, a plot synopsis may first appear within the magnified area 161, as shown previously in FIG. 10. After a pre-determined amount of time (e.g., 3-5 seconds), the content feed 210 of the selected media content instance may replace the plot synopsis within the magnified area 161, as shown in FIG. 11.

Figure 12:
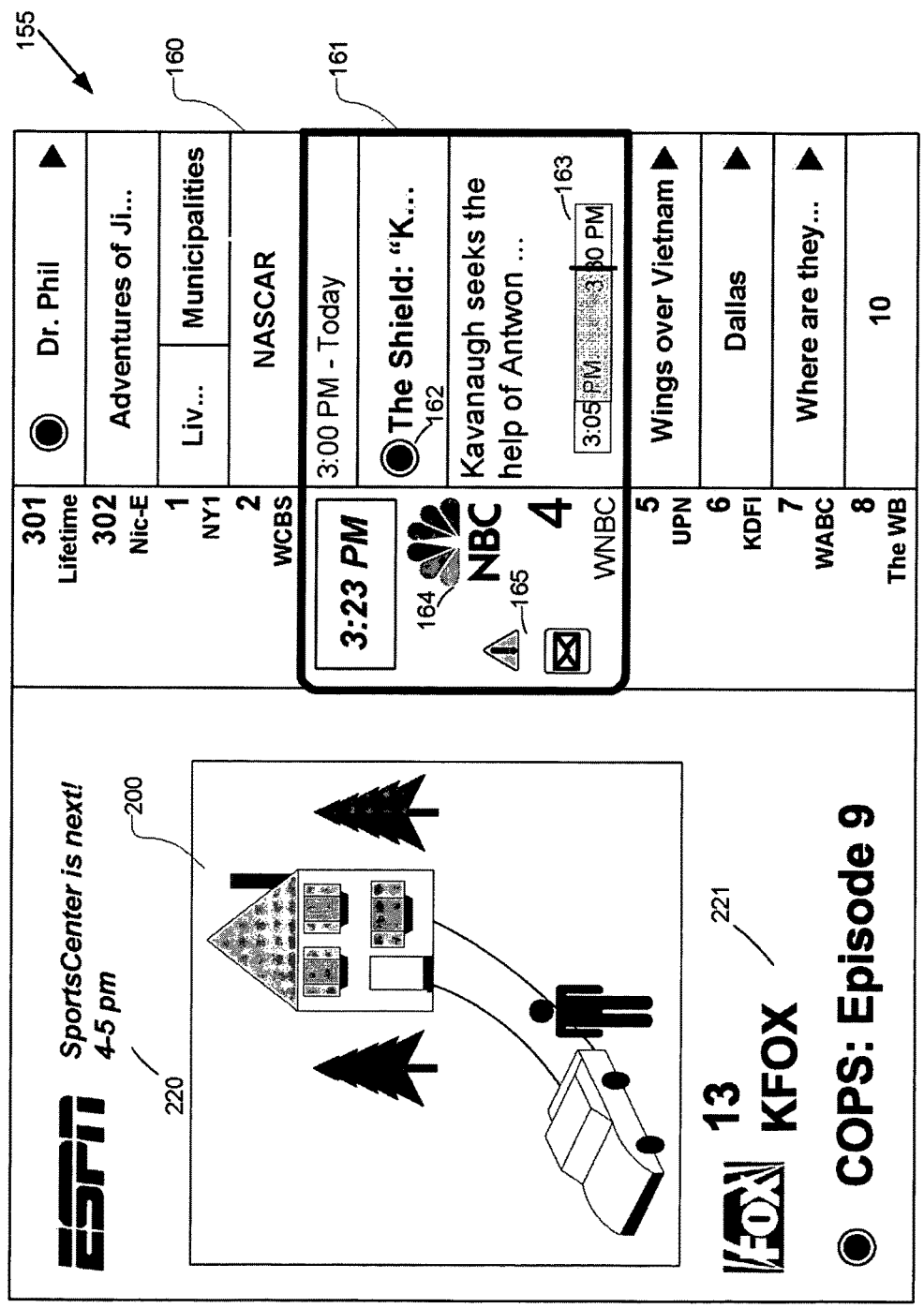
FIG. 12 illustrates another exemplary view of the program guide of FIG. 10, according to an embodiment.

In some embodiments, information and/or one or more advertisements may be displayed in a portion of the viewing screen 155 not occupied by the program guide 160. For example, as shown in FIG. 12, an advertisement 220 for SportsCenter® on ESPN® may be displayed above the displayed primary media content instance 200. Information corresponding to the displayed primary media content instance 200, such as the title and/or other information 221 shown in FIG. 12, may additionally or alternatively be displayed.

In some example, if a user presses the select button 153 while within the program guide 160, the processing subsystem 110 tunes the primary feed 200 to the media content instance located within the magnified area 161. However, if the user presses the select button 153 to select a media content instance that is not currently being broadcast, a detailed information page corresponding to the selected media content instance may be displayed on the viewing screen 155.

III. Exemplary Process View

Figure 13:
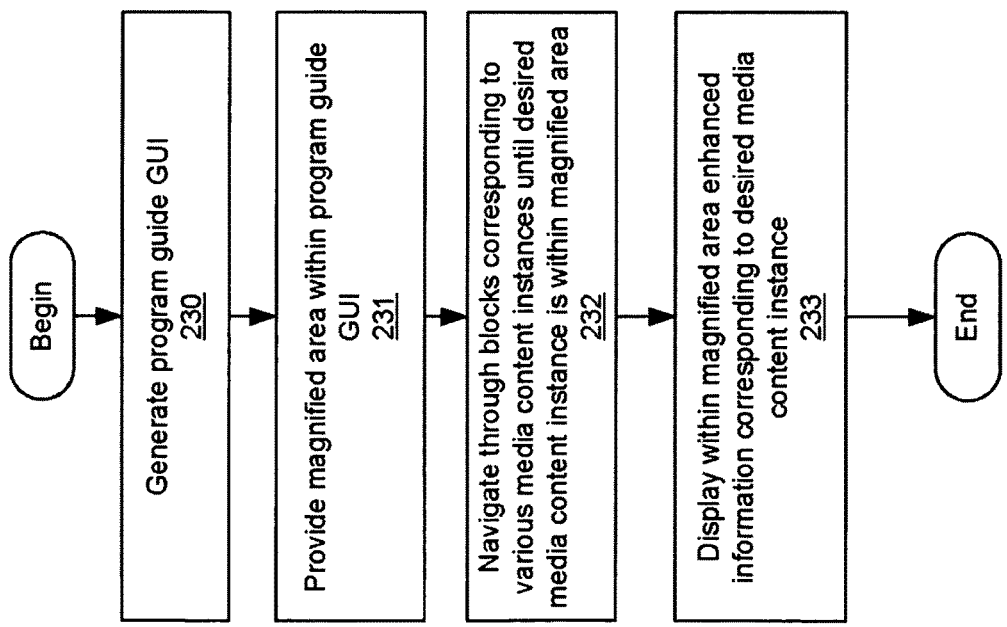
FIG. 13 illustrates an exemplary method of accessing enhanced information corresponding to a desired media content instance, according to an embodiment.

FIG. 13 illustrates an exemplary method of accessing enhanced information corresponding to a desired media content instance, according to an embodiment. While FIG. 13 illustrates exemplary steps according to one embodiment, other embodiments may omit, add to, reorder, and/or modify any of the steps shown in FIG. 13.

In step 230, a program guide GUI 160 is generated. The program guide GUI 160 may be generated using any suitable application within the processing subsystem 110 as described previously.

A magnified area 161 may then be provided within the program guide GUI 160, as shown in step 231. In some examples, the magnified area 161 is stationary and centered vertically within the program guide 160.

In step 232, a user may then navigate through the blocks of information within the program guide GUI 160 until the desired media content instance is located within magnified area 161. Once the desired media content instance is located within the magnified area 161, the enhanced information corresponding to the desired media content instance may be displayed within the magnified area 161.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a media content processing subsystem configured to
display a scrollable program guide graphical user interface configured to show a multiplicity of blocks of information corresponding to a multiplicity of content carriers; and
display a magnified area within said program guide graphical user interface;
wherein, when a block having a unexpanded width and corresponding to a particular content carrier within said multiplicity of content carriers enters into said magnified area by scrolling of said program guide graphical user interface, said processing subsystem is configured to display enhanced information within said magnified area, said enhanced information corresponding to a selected media content instance transmitted via said particular content carrier;
wherein said magnified area is defined by a stationary border that is displayed in a substantially stationary location within said program guide graphical user interface;
wherein said magnified area includes a first portion, within the stationary border, that is displayed in a first row across the unexpanded width and a second portion, within the stationary border, including said enhanced information that is displayed in a second row across an expanded viewing width, wider than the unexpanded width of the first portion, spanning the multiplicity of blocks of said program guide graphical user interface;
wherein said magnified area is configured to display a progress bar to graphically illustrate a recorded amount associated with the selected media content instance;
wherein said processing device is further configured to display a primary video feed of the selected media content instance within a portion of said viewing area that is not occupied by said program graphical user interface;
wherein said enhanced information comprises a secondary content video feed that is displayed in the second portion within the stationary border of said magnified area, said secondary content video feed corresponding to a selected second media content instance transmitted via said particular content carrier; and
wherein said processing subsystem is further configured to display a plot synopsis within said magnified area, delay for a specified pre-determined amount of time, and after said pre-determined amount of time has elapsed, replace said plot synopsis within said magnified area with said secondary content video feed.

* * * * *